United States Patent
Lasserre et al.

(10) Patent No.: US 11,250,597 B2
(45) Date of Patent: Feb. 15, 2022

(54) METHOD AND APPARATUS FOR ENCODING/DECODING THE GEOMETRY OF A POINT CLOUD REPRESENTING A 3D OBJECT

(71) Applicant: InterDigital VC Holdings, Inc., Wilmington, DE (US)

(72) Inventors: Sebastien Lasserre, Cesson-Sevigne (FR); Celine Guede, Cesson-Sevigne (FR); Jean-Claude Chevet, Cesson-Sevigne (FR)

(73) Assignee: InterDigital VC Holdings, Inc., Wilmington, DE (US)

(*) Notice: Subject to any disclaimer, the term of this patent is extended or adjusted under 35 U.S.C. 154(b) by 6 days.

(21) Appl. No.: 16/756,352

(22) PCT Filed: Oct. 17, 2018

(86) PCT No.: PCT/US2018/056219
§ 371 (c)(1),
(2) Date: Apr. 15, 2020

(87) PCT Pub. No.: WO2019/079397
PCT Pub. Date: Apr. 25, 2019

(65) Prior Publication Data
US 2021/0201541 A1     Jul. 1, 2021

(30) Foreign Application Priority Data

Oct. 19, 2017   (EP) .................................... 17306420

(51) Int. Cl.
*G06T 9/40*     (2006.01)
*G06T 9/00*     (2006.01)

(52) U.S. Cl.
CPC ................ *G06T 9/40* (2013.01); *G06T 9/001* (2013.01)

(58) Field of Classification Search
None
See application file for complete search history.

(56) References Cited

U.S. PATENT DOCUMENTS 8,022,951 B2* 9/2011 Zhirkov ................ G06T 15/205
                                                            345/427
8,217,941 B2* 7/2012 Park ...................... G06T 15/205
                                                            345/427
(Continued)

FOREIGN PATENT DOCUMENTS

EP          3595179 A1    1/2020

OTHER PUBLICATIONS

Anonymous, "Current Status on Point Cloud Compression", International Organization on Standardization, ISO/IEC JTC 1/SC 29/WG 11, Coding of Moving Pictures and Audio, ISO/IEC JTC 1/SC 29/WG 11 N15869, Geneva, Switzerland, Oct. 2015, 11 pages.

(Continued)

*Primary Examiner* — Anand P Bhatnagar
(74) *Attorney, Agent, or Firm* — Condo Roccia Koptiw LLP

(57) ABSTRACT

The present principles generally relate to encoding and decoding of a point cloud representing the geometry of a point cloud representing a 3D object. According to the invention, prediction is used in the encoding process of the splitting information of the local octree-based structure and/or in the 10 encoding process of the occupancy information of the leaf cubes of the local octree-based structure. A predictor of the local octree-based structure is used for determining the context of the context-dependent entropy encoding in order to reduce the number of bits needed for the octree encoding.

26 Claims, 13 Drawing Sheets

(56) References Cited

U.S. PATENT DOCUMENTS

| | | | | |
|---|---|---|---|---|
| 10,003,794 | B2* | 6/2018 | Jiang | G06T 17/005 |
| 10,693,492 | B1* | 6/2020 | Lasserre | H03M 7/6011 |
| 10,861,196 | B2* | 12/2020 | Mammou | H04N 19/45 |
| 2013/0039422 | A1* | 2/2013 | Kirchhoffer | H04N 19/46 375/240.13 |
| 2017/0214943 | A1* | 7/2017 | Cohen | H04N 19/136 |
| 2017/0347123 | A1* | 11/2017 | Panusopone | H04N 19/124 |
| 2019/0080483 | A1* | 3/2019 | Mammou | H04N 19/90 |
| 2019/0081638 | A1* | 3/2019 | Mammou | H03M 7/6064 |
| 2021/0119640 | A1* | 4/2021 | Mammou | H03M 7/6064 |
| 2021/0150771 | A1* | 5/2021 | Huang | G06N 5/046 |

OTHER PUBLICATIONS

Lasserre, S., "What is point cloud compression ?", Point Cloud Compression Presentation to the Video Groups, International Organization on Standardization, ISO/IEC JTC1/SC29/WG11, Coding of Moving Pictures and Audio, ISO/IEC JTC1/SC29/WG11 MPEG2017/m40715, Hobart, Australia, Apr. 2017, 20 pages.

Peng et al., "Geometry-guided Progressive Lossless 3D Mesh Coding with Octree (OT) Decomposition", ACM Transactions on Graphics, vol. 24, No. 3, Jul. 2005, pp. 609-616.

Schnabel et al., "Octree-based Point-Cloud Compression", Symposium on Point Based Graphics, Boston, Massachusetts, USA, Jan. 2006, pp. 111-121.

Song et al., "Progressive Compression of Point Texture Images", Proceedings of SPIE, Visual Communications and Image Processing, vol. 5308, Jan. 18, 2004, pp. 1159-1168.

Kammerl et al., "Real-time Compression of Point Cloud Streams", 2012 IEEE International Conference on Robotics and Automation, Saint Paul, Minnesota, USA, May 14, 2012, pp. 778-785.

Garcia et al., "Context-Based Octree Coding for Point-Cloud Video", IEEE International Conference on Image Processing (ICIP), Beijing, China, Sep. 17, 2017, pp. 1412-1416.

* cited by examiner

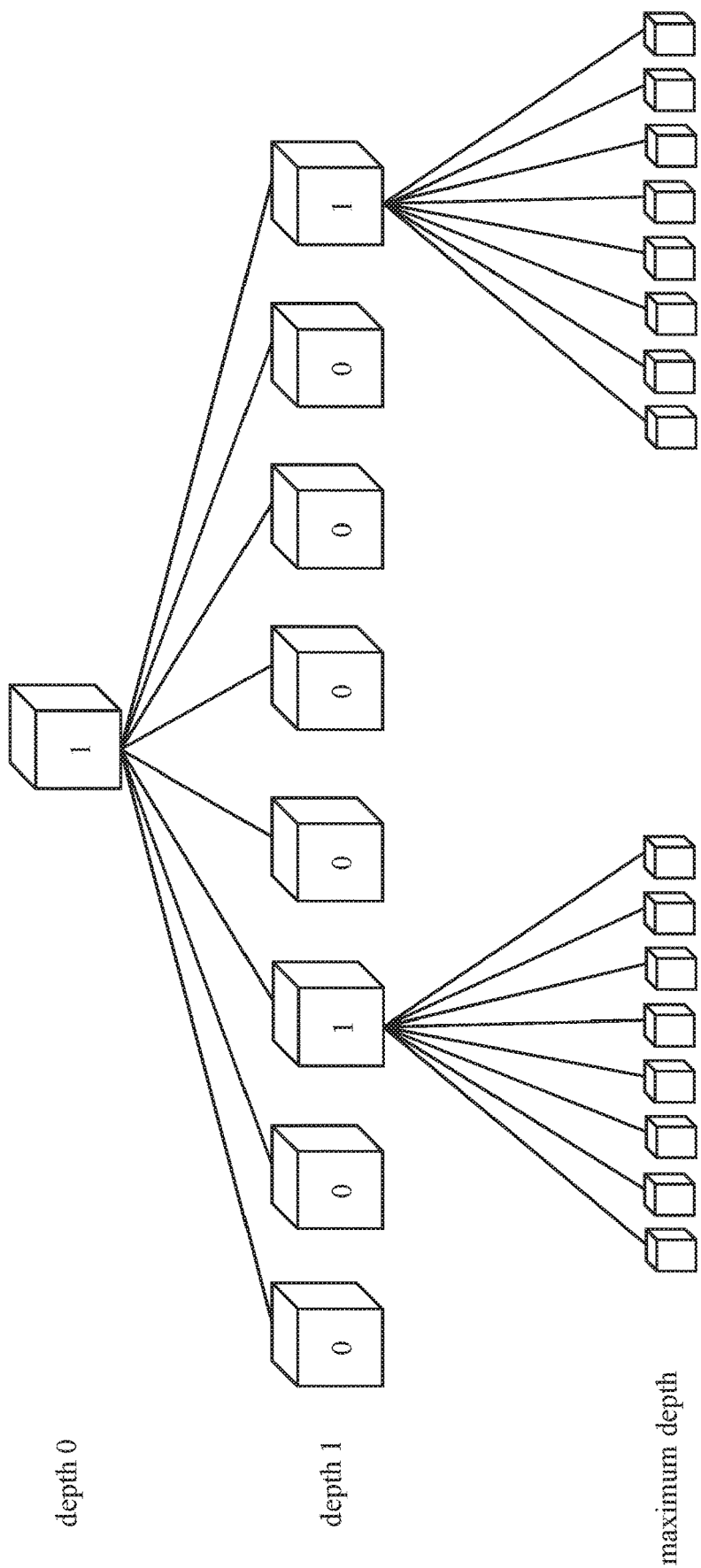

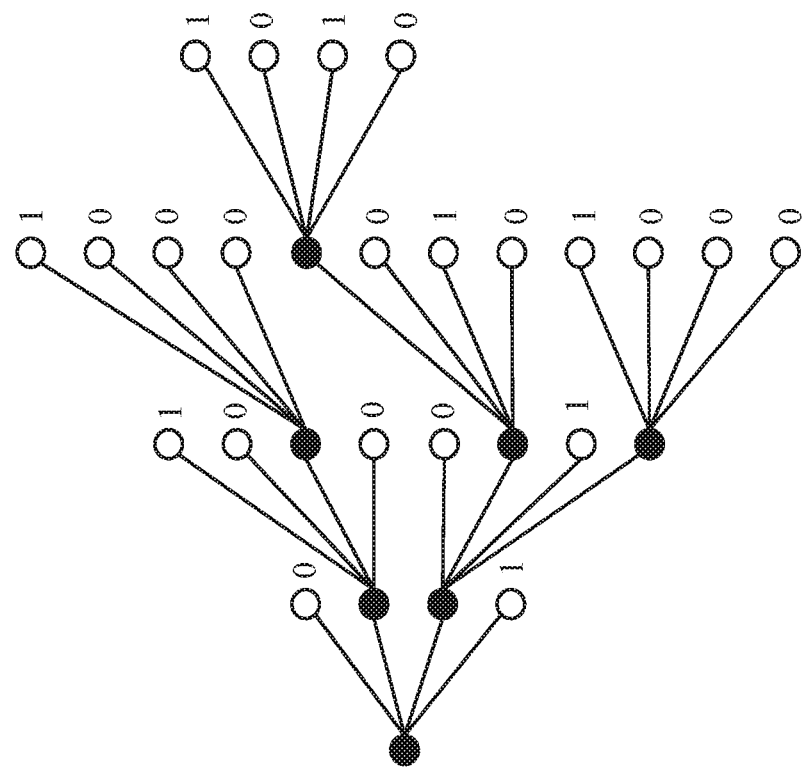
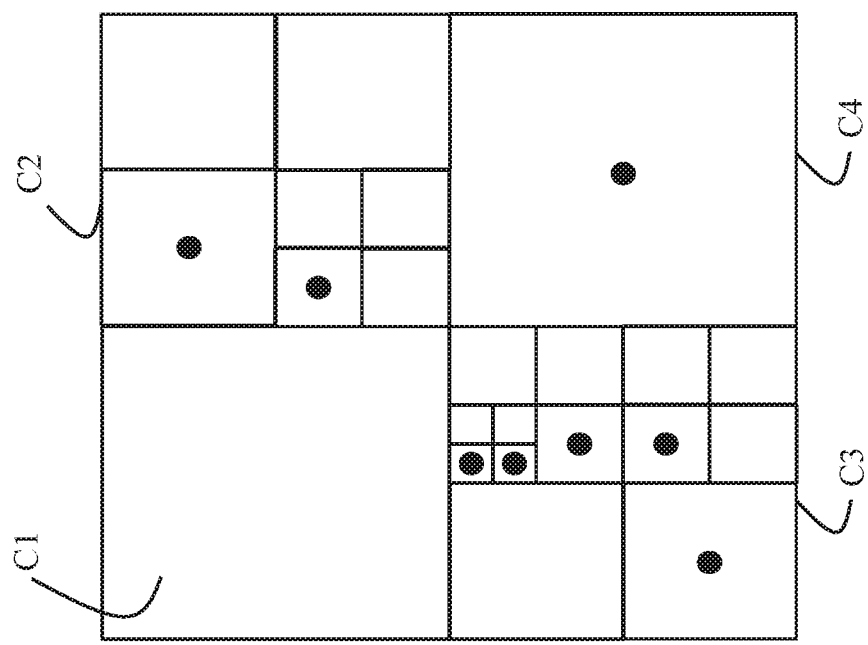
Fig. 5

METHOD AND APPARATUS FOR ENCODING/DECODING THE GEOMETRY OF A POINT CLOUD REPRESENTING A 3D OBJECT

This application claims the benefit, under 35 U.S.C. § 365 of International Application PCT/US2018/056219, filed Oct. 17, 2018, which was published in accordance with PCT Article 21(2) on Apr. 25, 2019, in English, and which claims the benefit of European Patent Application No. 17306420.5 filed Oct. 19, 2017.

FIELD OF THE INVENTION

The present principles generally relate to encoding and decoding of a point cloud representing the geometry of a point cloud representing a 3D object. Particularly, but not exclusively, the technical field of the present principles are related to octree-based encoding/decoding of point cloud.

BACKGROUND OF THE INVENTION

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A point cloud is a set of points usually intended to represent the external surface of a 3D object but also more complex geometries like hair, fur that may not be represented efficiently by other data format like meshes. Each point of a point cloud is often defined by a 3D spatial location (X, Y, and Z coordinates in the 3D space) and possibly by other associated attributes such as color, represented in the RGB or YUV color space for example, a transparency, a reflectance, a two-component normal vector, etc.

A colored point cloud may be a set of 6-components points (X, Y, Z, R, G, B) or equivalently (X, Y, Z, Y, U, V) where (X,Y,Z) defines the spatial location of a point in a 3D space and (R,G,B) or (Y,U,V) defines a color of this point.

In the following the term "point cloud" refers to any point cloud including a colored point cloud.

Colored point clouds may be static or dynamic depending on whether or not the cloud evolves with respect to time. It should be noticed that in case of a dynamic point cloud, the number of points is not constant but, on the contrary, generally evolves with time. A dynamic point cloud is thus a time-ordered list of sets of points.

Practically, colored point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such colored point clouds are typically static and huge.

Another use case is in topography and cartography in which, by using 3D representations, maps are not limited to the plane and may include the relief.

Automotive industry and autonomous cars are also domains in which point clouds may be used. Autonomous cars should be able to "probe" their environment to take safe driving decision based on the reality of their immediate neighboring. Typical sensors produce dynamic point clouds that are used by the decision engine. These point clouds are not intended to be viewed by a human being. They are typically small, not necessarily colored, and dynamic with a high frequency of capture. They may have other attributes like the reflectance that is a valuable information correlated to the material of the physical surface of sensed object and may help the decision.

Virtual Reality (VR) and immersive worlds have become a hot topic recently and foreseen by many as the future of 2D flat video. The basic idea is to immerse the viewer in an environment all round him by opposition to standard TV where he can only look at the virtual world in front of him. There are several gradations in the immersivity depending on the freedom of the viewer in the environment. Colored point clouds are a good format candidate to distribute VR words. They may be static or dynamic and are typically of averaged size, say no more than a few millions of points at a time.

Point cloud compression will succeed in storing/transmitting 3D objects for immersive worlds only if the size of the bitstream is low enough to allow a practical storage/transmission to the end-user.

It is also crucial to be able to distribute dynamic point clouds to the end-user with a reasonable consumption of bandwidth while maintaining an acceptable (or preferably very good) quality of experience. Similarly to video compression, a good use of temporal correlation is thought to be the crucial element that will lead to efficient compression of dynamic point clouds.

Well-known approaches project a colored point cloud representing the geometry and colors of a 3D object, onto the faces of a cube encompassing the 3D object to obtain videos on texture and depth, and code the texture and depth videos using a legacy encoder such as 3D-HEVC (an extension of HEVC whose specification is found at the ITU website, T recommendation, H series, h265, http://www.itu.int/rec/T-REC-H.265-201612-I/en annex G and I).

Performance of compression is close to video compression for each projected point, but some contents may be more complex because of occlusions, redundancy and temporal stability when dynamic point clouds are considered. Consequently, point cloud compression is more demanding than video compression in term of bit-rates.

Regarding occlusions, it is virtually impossible to get the full geometry of a complex topology without using many projections. The required resources (computing power, storage memory) for encoding/decoding all these projections are thus usually too high.

Octree-based encoding is also a well-known approach for encoding the geometry of a point cloud. An octree-based structure is obtained for representing the geometry of the point cloud by splitting recursively a cube encompassing the point cloud until the leaf cubes, associated with the leaf nodes of said octree-based structure, contain no more than one point of the point cloud. The spatial locations of the leaf nodes of the octree-based structure thus represent the spatial locations of the points of the point cloud, i.e. its geometry.

The basic principle of octree-based encoding is to split the space represented as a big cube into eight sub-spaces represented by eight smaller cubes recursively. Leaf cubes are marked occupied or not depending on whether there is a point of the point cloud in it. Information about the splitting of the octree and the occupancy of the leaf cubes are encoded before being transmitted into a stream in order to reduce the amount of data to be transmitted.

Such information about the splitting of the octree and the occupancy of the leaf cubes are commonly entropy coded in order to reduce the number of bits needed for the octree coding.

SUMMARY

The present disclosure provides a method according to claim 1 and a device according to claim 2. It also provides a method according to claim 13 and a device according to claim 14. It further provides a signal according to claim 16.

A purpose of the invention is to further reduce the number of bits needed for the octree coding.

According to the invention, prediction is used to further improve the coding performance.

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

Octree-based encoding is based on a two-step approach for encoding the geometry of a point cloud. In a first step, an octree-based structure is obtained by splitting recursively a cube encompassing the point cloud until the leaf cubes associated with the leaf nodes of said octree-based structure reach down an expected size. In a second step, for each leaf cube associated with the leaf nodes of said octree-based structure (IO), the approach determines if a local octree-based structure is associated (or not) with a leaf cube by using a Rate-Distorsion Optimisation process that optimizes a trade-off between a bit-rate for encoding a candidate octree-based structure approximating the geometry of points of the point cloud which are included in said leaf cube of the octree-based structure, and a distortion that takes into account spatial distances between, on one hand, said points of the point cloud, and on the other hand, points included in leaf cubes associated with leaf nodes of the candidate octree-based structure.

Representing the geometry of a point cloud by the octree-based structure (step 1) and local octree-based structures (step 2) is advantageous because it allows to determine locally an optimal representation of the geometry, i.e. the optimization process optimizes the octree-based structure on a smaller amount of points, thus reducing dramatically the complexity of optimization which is usually done over the whole set of points of the point cloud.

The splitting information and occupancy information of the octree-based structure and the local octree-based structure are encoded by a context dependent entropy encoding process.

According to the invention, prediction is used in the encoding process of the splitting information of the local octree-based structure and/or in the encoding process of the occupancy information of the leaf cubes of the local octree-based structure. A predictor of the local octree-based structure is used for determining the context of the context-dependent entropy encoding in order to further reduce the number of bits needed for the octree encoding.

The present principles relate to a method and a device for encoding the geometry of a point cloud representing a 3D object. According to an embodiment, the method comprises:

a) determining if a local octree-based structure is associated with an encompassing cube including at least one point of the point cloud by optimizing a trade-off between a bit-rate for encoding a candidate octree-based structure approximating the geometry of points of the point cloud which are included in said an encompassing cube, and a distortion taking into account spatial distances between, on one hand, said points of the point cloud which are included in said encompassing cube, and on the other hand, points included in leaf cubes associated with leaf nodes of the candidate octree-based structure;

b) if a local octree-based structure has been determined for said encompassing cube, b.1) obtaining a predictor of said local octree-based structure;

b.2) encoding an octree information data representative of said determined local octree-based structure by using a first context dependent entropy encoding;

b.3) encoding a leaf node information data indicating if a leaf cube of said local octree-based structure includes a point representative of a part of the point cloud by using a second context dependent entropy encoding, wherein the context of at least one of said first and second context dependent entropy encodings is depending on said predictor.

According to an embodiment, an information representative of said predictor is also encoded, for example using a context dependent entropy encoding.

According to an embodiment, the first and second context dependent entropy encoding are a Context Adaptative Binary Arithmetic Coding.

According to an embodiment, the predictor is obtained from an already encoded local octree-based structure.

According to an embodiment, the predictor is obtained from an already encoded local octree-based structure of the point cloud.

According to an embodiment, the predictor is obtained from an already encoded local octree-based structure of a previous point cloud.

According to an embodiment, the context of the first context dependent entropy encoding for encoding a second octree information data associated to a node of the local octree-based structure is depending on the presence or not of a splitting of the cube associated with the corresponding node of the predictor.

According to an embodiment, the context of the second context dependent entropy encoding for encoding a second leaf information data associated to a node of the local octree-based structure is depending on the presence or not of a point in the leaf cube associated with the corresponding node of the predictor.

According to an embodiment, the context of the second context dependent entropy encoding for encoding a second leaf information data associated to a node of the local octree-based structure is depending on the distance between the center of the leaf cube and the closest point in the local octree-based structure of the predictor. Advantageously, a finite number of quantized distances is preferably predefined.

According to an embodiment, the context of at least one of said first and second context dependent entropy encodings is determined based on a octree depth value associated to the octree information data or the leaf node information data to be encoded.

According to an embodiment, the method also comprises steps of or the device also comprises means for
    determining an octree-based structure comprising at least one cube, by splitting recursively a cube encompassing the point cloud until the leaf cubes, associated with the leaf nodes of said octree-based structure, reach down an expected size;

encoding another octree information data representative of the octree-based structure; and encoding another octree information data indicating if a leaf cube of the octree-based structure includes a point representative of a part of the point cloud.

According to an embodiment, the distortion takes into account spatial distances between, on one hand, said points of the point cloud, and on the other hand, points included in leaf cubes associated with leaf nodes of the candidate octree-based structure together with points of an inverse-projected point cloud which are included in said leaf cube, said inverse-projected point cloud being obtained by inverse-projecting at least one depth image representative of a part of the point cloud.

According to an embodiment, a candidate octree-based structure approximating the geometry of points of the point cloud which are included in a leaf cube is obtained by pruning an initial candidate octree-based structure at a given level.

According to an embodiment, a candidate octree-based structure comprises at least one leaf node and the leaf cube associated to a leaf node includes or not a single point.

According to an embodiment, said single point is located at the center of the leaf cube.

The invention also relates to a method and device for decoding, from a bitstream, a point cloud representing a 3D object. According to an embodiment, the method comprises:

c) decoding, from the bitstream, a first leaf node information data indicating if a local octree-based structure has been determined for an encompassing cube including at least one point representing at least a part of the point cloud to be decoded;

d) if said first leaf node information data indicates that a local octree-based structure has been associated with said encompassing cube, d.1) decoding, from the bitstream, information representative of a predictor of said local octree-based structure:

d.2) decoding, from the bitstream and said predictor, an octree information data representative of said determined local octree-based structure, and a second leaf node information data indicating if a leaf cube of said local octree-based structure includes a point representative of a part of the point cloud;

d.3) obtaining a local octree-based structure for said leaf cube from said octree information data;

d.4) determining if a leaf cube of said local octree-based structure includes a point of the point cloud to be decoded from the second leaf node information data, and in that case, adding a point to the leaf cube of said local octree-based structure.

According to an embodiment, the method also comprises steps for or the device also comprises means for decoding, from the bitstream, another octree information data;

obtaining an octree-based structure from said another octree information data.

According to another of their aspects, the present principles also relates, according to an embodiment, to a signal carrying:

a first octree information data representative of a octree-based structure representing a splitting of a 3D space delimited by a cube encompassing a point cloud representing a 3D object;

for each leaf cube, associated with the leaf nodes of said octree-based structure a first leaf node information data indicating if a local octree-based structure has been determined for each leaf cube associated with a leaf node if said octree-based structure;

if a first leaf node information data indicates that a local octree-based structure has been determined for a leaf cube, information representative of a predictor of said local octree-based structure;

a second octree information data representative of said determined local octree-based structure; and a second leaf node information data indicating if a leaf cube of said local octree-based structure includes a point representative of a part of the point cloud.

According to another of their aspects, the present principles also relates to a non-transitory processor-readable medium having stored thereon instructions to execute the steps of a method as defined hereinabove when this program is executed on a computer.

The specific nature of the present principles as well as other objects, advantages, features and uses of the present principles will become evident from the following description of examples taken in conjunction with the accompanying drawings.

BRIEF DESCRIPTION OF DRAWINGS

In the drawings, examples of the present principles are illustrated. It shows:

FIG. 2 illustrates an example of an octree-based structure;

FIG. 5 shows an illustration of an example of a candidate octree-based structure:

Similar or same elements are referenced with the same reference numbers.

DESCRIPTION OF EXAMPLE OF THE PRESENT PRINCIPLES

Figure 1:
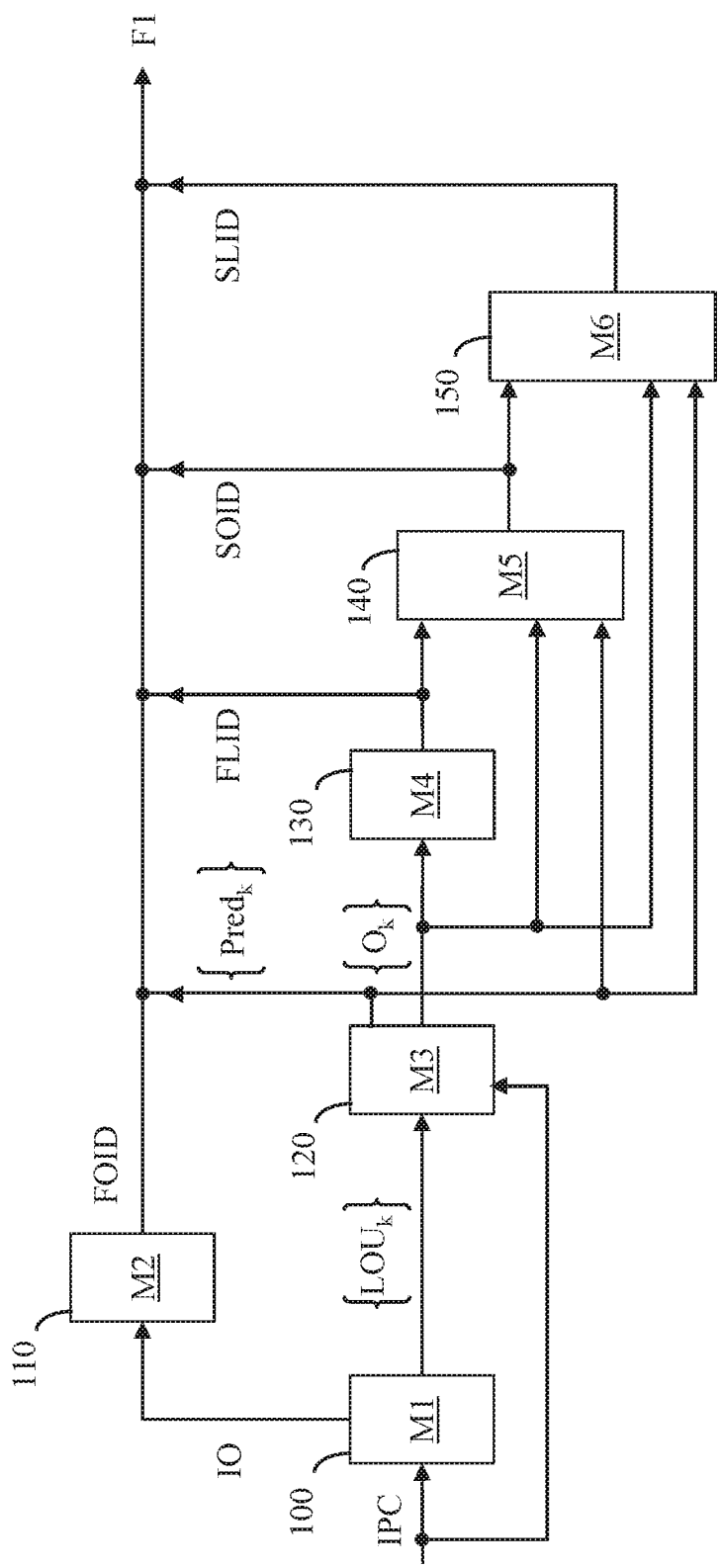
FIG. 1 shows schematically a diagram of the steps of the method for encoding the geometry of a point cloud representing a 3D object in accordance with an example of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding a colored point cloud but extends to the encoding/decoding of a sequence of colored point clouds because each colored point cloud of the sequence is sequentially encoded/decoded as described below.

In the following, an image contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of nv values, where nv is the number of components. Each value of a vector is represented with a number of bits which defines a maximal dynamic range of the pixel values.

A depth image is an image whose pixel values depths of 3D points. Usually, a depth image is a grey levels image.

An octree-based structure comprises a root node, at least one leaf node and possibly intermediate nodes. A leaf node is a node of the octree-based cube which has no child. All other nodes have children. Each node of an octree-based structure is associated with a cube. Thus, an octree-based structure comprises a set $\{C_j\}$ of at least one cube $C_j$ associated with node(s).

A leaf cube is a cube associated with a leaf node of an octree-based structure.

In the example illustrated on FIG. 2, the cube associated with the root node (depth 0) is split into 8 sub-cubes (depth 1) and two sub-cubes of depth 1 are then split into 8 sub-cubes (last depth=maximum depth=2).

The sizes of the cubes of a same depth are usually the same but the present principles are not limited to this example. A specific process may also determine different numbers of sub-cubes per depth, when a cube is split, and/or multiple sizes of cubes of a same depth or according to their depths.

In the following, the term "local octree-based structure determined for a cube" refers to an octree-based structure determined in the 3D space delimited by the cube that encompasses a part of the point cloud to be encoded.

In the opposite, a global octree-based structure refers to an octree-based structure determined in a 3D space delimited by the cube that encompasses the point cloud to be encoded.

FIG. 1 shows schematically a diagram of the steps of the method for encoding the geometry of a point cloud IPC representing a 3D object in accordance with an example of the present principles.

In step 100, a module M1 determines an octree-based structure IO comprising at least one cube, by splitting recursively a cube encompassing the point cloud until the leaf cubes, associated with the leaf nodes of said octree-based structure IO, reach down an expected size.

The leaf cubes associated with the leaf nodes of the octree-based structure IO may then include or not points of the point cloud IPC. A leaf cube associated with a leaf node of the octree-based structure IO is named in the following a Largest Octree Unit ($LOU_k$), k means an index referencing the Largest Octree Unit associated with a leaf node k of the octree-based structure IO.

In step 110, a module M2 encodes a first octree information data FOID representative of the octree-based structure IO.

In step 120, for each $LOU_k$, a module M3 determines if a local octree-based structure $O_k$ is associated with a $LOU_k$ by optimizing a trade-off between a bit-rate $R_{k,n}$ for encoding a candidate octree-based structure $O_{k,n}$ approximating the geometry of points $P_{k,or}$ of the point cloud IPC which are included in said $LOU_k$, and a distortion $D_{k,n}$ taking into account spatial distances between, on one hand, said points $P_{k,or}$ of the point cloud IPC, and on the other hand, points $P_{k,n}$ included in leaf cubes associated with leaf nodes of the candidate octree-based structure $O_{k,n}$.

Mathematically speaking, the distortion $D_{k,n}$ is a metric given by:

$$D_{k,n}=d(P_{k,n},P_{k,OR})+d(P_{k,OR},P_{k,n})$$

where d(A,B) is a metric that measures the spatial distance from a set of points A to a set of points B. This metric is not symmetric, this means that distance from A to B differs from the distance from B to A.

The distance $d(P_{k,n}, P_{k,OR})$ ensures that the points included in leaf cubes associated with leaf nodes of a candidate octree-based structure $O_{k,n}$ are not too far from the point cloud IPC, avoiding coding irrelevant points.

The distance $d(P_{k,OR}, P_{k,n})$ ensures that each point of the point cloud IPC is approximated by points not too far from them, i.e. ensures that all parts of the point cloud IPC are well approximated.

According to an embodiment, the distance d(A,B) is given by:

$$d(A, B) = \sum_{p \in A} \|p - q_{closest}(p, B)\|_2^2$$

where the norm is the Euclidan distance and $q_{closest}(p, B)$ is the closest point of B from a point p of A defined as $$q_{closest}(p, B) = \operatorname*{argmin}_{q \in B} \|p - q\|_2^2.$$

According to the optimization process, it may be happen that a $LOU_k$ does not include any point of the point cloud IPC. In that case the $LOU_k$ is named a non-coded $LOU_k$.

It may also happen that the optimization process determines that the points of the point cloud IPC which are included in the LOU are not represented (coded) by any candidate octree-based structure $O_{k,n}$. This is the case when the cost for coding those points is too high relatively to the cost associated with $R_{k,n}=0$ and the distortion $D_{k,n}$ obtained between already coded points, from other already coded LOU for example, and $P_{k,OR}$.

In said step 120, a predictor $Pred_k$ of the local octree-based structure $O_k$ is also determined from already coded LOU as described later. The predictors $Pred_k$ may be obtained by intra prediction or inter prediction as described later.

In step 130, for each $LOU_k$, a module M4 encodes a first leaf node information data FLID indicating if a local octree-based structure $O_k$ has been determined for said $LOU_k$.

If a first leaf node information data FLID indicates that a local octree-based structure $O_k$ has been determined for a $LOU_k$, in step 140 a module M5 encodes a second octree information data SOID representative of said determined local octree-based structure $O_k$, and in step 150, a module M6 encodes a second leaf node information data SLID indicating if a leaf cube of said local octree-based structure $O_k$ includes a point representative of a part of the point cloud IPC.

The first octree information data FOID, the first leaf node information data FLID, the second octree information data SOID and the second leaf node information data SLID may be stored and/or transmitted in a bitstream F1.

According to an embodiment of step 110 and/or 140, illustrated on FIG. 2, the first octree information data FOID data and the second octree information data SOID comprises a binary flag per node which equal to 1 to indicate that a cube associated with said node is split and to 0 otherwise.

According to an embodiment of step 120, the first leaf node information data FLID comprises a binary flag per leaf node which equal to 1 to indicate if a local octree-based structure $O_k$ has been determined for a $LOU_k$ and to 0 otherwise.

According to an optional variant, the module M2 also generates a maximum depth of the cube splitting.

This avoids signaling first octree information data for all cubes having the maximum depth.

According to an embodiment of step 150, the second leaf node information data SLID comprises a binary flag per leaf node which equal to 1 to indicate if a leaf cube of a local octree-based structure $O_k$ includes a point representative of a part of the point cloud IPC and to 0 otherwise.

According to an embodiment, the first octree information data FOID, the first leaf node information data FLID, the second octree information data SOID and/or the second leaf node information data SLID may be coded using an entropy coder like CABAC (a description of the CABAC is found in the specification of HEVC at http://www.itu.int/rec/T-REC-H.265-201612-1/en).

Entropy encoding the second octree information data SOID and/or the second leaf node information data SLID is efficient in term of coding, because specific contexts are used to code the binary flags per node because usually only a few nodes of an octree-based structure are split and the probability for the binary flags associated with neighboring nodes to have a same value is high.

According to the invention, the predictor $Pred_k$ is used to encode the second octree information data SOID and/or the second leaf node information data SLID as described later in order to save bits.

Figures 3, 4:
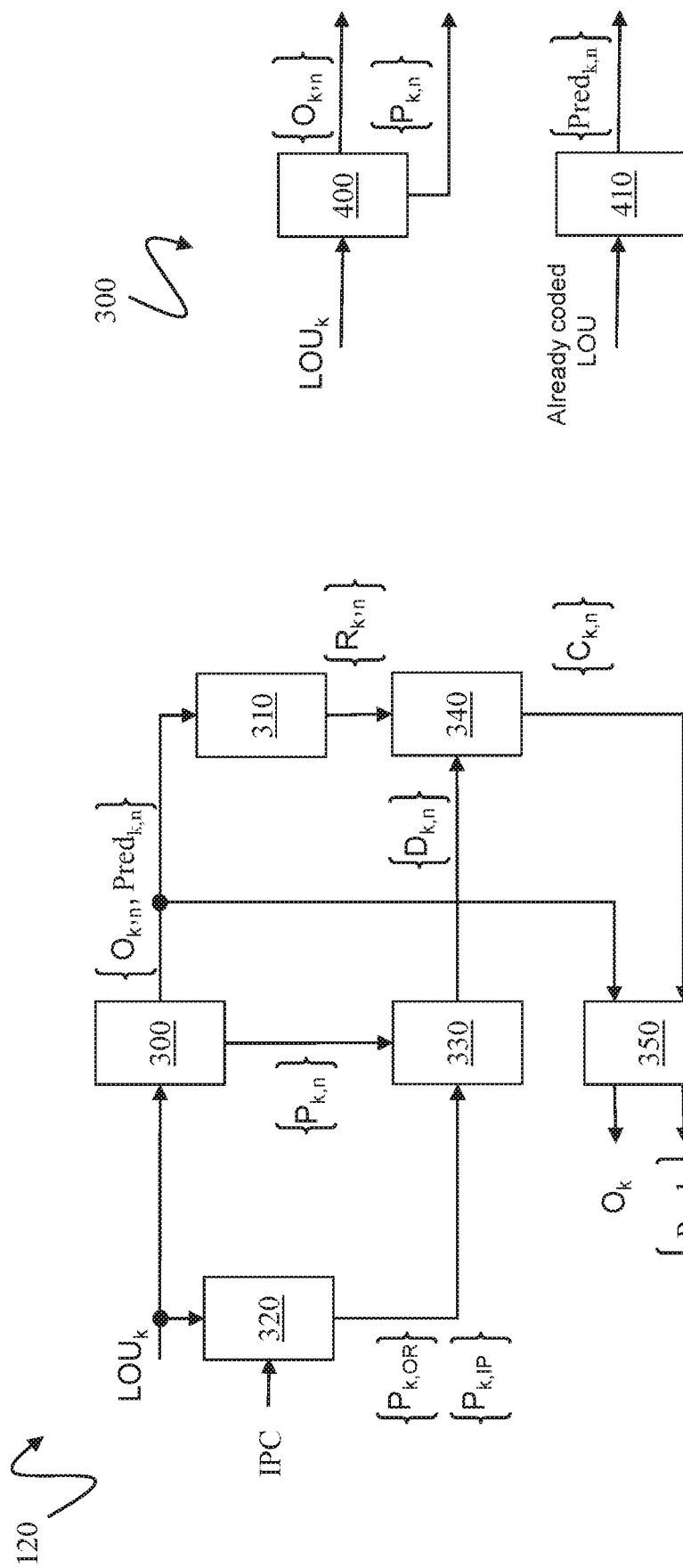
FIG. 3 shows the diagram of the sub-steps of the step 120 of FIG. 1 in accordance with an embodiment of the present principles.
FIG. 4 shows the diagram of the sub-steps of the step 300 of FIG. 3 in accordance with an embodiment of the present principles.

FIG. 3 shows the diagram of the sub-steps of the step 120 in accordance with an embodiment of the present principles.

As discussed above, an octree-based structure IO comprising at least one $LOU_k$ is obtained, and a Rate Distortion optimization (RDO) process is used to determine a best local octree-based structure $O_k$ for at least one $LOU_k$.

A single flag may then be encoded in the bitstream F1 to indicate if a LOU includes or not a point of the point cloud IPC.

A RDO process that is performed on a LOU may find a best local octree-based structure $O_k$ from N candidate octree-based structures $O_{k,n}$ ($n \in [1; N]$). The basic principle is to test successively each candidate octree-based structure $O_{k,n}$ and for each candidate octree-based structure $O_{k,n}$ to calculate a Lagrangian cost $C_{k,n}$ given by:

$$C_{k,n} = D_{k,n} + \lambda R_{k,n} \quad (1)$$

where $R_{k,n}$ and $D_{k,n}$ are respectively the bit-rate and distortion detailed above, and $\lambda$ is a fixed Lagrange parameter that may be fixed for all the candidate octree-based structures $O_{k,n}$.

The best local octree-based structure $O_k$ is then obtained by minimizing the Lagrangian cost $C_{k,n}$:

$$O_k = \underset{O_{k,n}}{\arg\min} C_{k,n}(O_{k,n}) \quad (2)$$

High values for the Lagrangian parameter strongly penalize the bit-rate $R_{k,n}$ and lead to a low quality of approximation, while low values for the Lagrangian parameter allow easily high values for $R_{k,n}$ and lead to high quality of approximation. The range of values for lambda depends on the distortion metric, the size of the $LOU_k$, and most importantly the distance between two adjacent points. Assuming that this distance is unity, typical values for lambda are in the range from a few hundreds, for very poor coding, to a tenth of unity for good coding. These values are indicative and may also depend on the content.

Determining a best local octree-based structure $O_k$ for a $LOU_k$ is now detailed in accordance with an embodiment of the present principles.

In step 300, the module M3 obtains a set of N candidate octree-based structures $O_{k,n}$ for the $LOU_k$ and obtains a set of points $P_{k,n}$ for each candidate octree-based structure $O_{k,n}$. The points $P_{k,n}$ are points which are included in cubes associated with leaf nodes of a candidate octree-based structure $O_{k,n}$.

The module M3 also obtains a set of N predictors $Pred_{k,n}$, one for each candidate octree-based structure $O_{k,n}$.

FIG. 4 shows the diagram of the sub-steps of the step 300 in accordance with an embodiment of the present principles.

In a step 400, the module M3 determines a set of N candidate octree-based structures $O_{k,n}$ for the $LOU_k$ and determines a set of points $P_{k,n}$ for each candidate octree-based structure $O_{k,n}$.

In a step 410, the module M3 also determines a set of N predictors $Pred_{k,n}$ from already coded $LOU_k$ one for each candidate octree-based structure $O_{k,n}$.

In step 310, the module M3 obtains the bit-rate $R_{k,n}$ for encoding each candidate octree-based structure $O_{k,n}$.

In step 320, the module M3 obtains points $P_{k,or}$ of the point cloud IPC which are included in the $LOU_k$.

In step 330, the module M3 obtains a distortion $D_{k,n}$ for each candidate octree-based structure $O_{k,n}$, each distortion $D_{k,n}$ taking into account the spatial distances between, on one hand, the points $P_{k,OR}$, and on the other hand, the points $P_{k,n}$.

In step 340, the module M3 calculates the Lagrangian cost $C_{k,n}$ according to equation (1) for each candidate octree-based structure $O_{k,n}$.

In step 350, the module M3 obtains the best local octree-based structure $O_k$ according to equation (2) once all the candidate octree-based structures $O_{k,n}$ have been considered. The predictor $Pred_k$ outputted by the module M3 is the predictor $Pred_{k,n}$ associated to the best local octree-based structure $O_k$.

Note that as explained above, it may then consider that the best trade-off for a $LOU_k$ is to not code the points included in it. In that case, no local octree-based structure $O_k$ is determined for this $LOU_k$.

According to an embodiment of step 300, a candidate octree-based structure $O_{k,n}$ comprises at least one leaf node and the leaf cube associated to a leaf node may (or not) include a single point.

FIG. 5 shows an illustration of an example of a candidate octree-based structure $O_{k,n}$ according to this embodiment. This figure represents an example of a quadtree-based structure that splits a square, but the reader will easily extend it to the 3D case by replacing the square by a cube ($LOU_k$).

According to this example, the cube is split into 4 sub-cubes C1, C2 C3 and C4 (depth 1). The sub-cube C1 is associated with a leaf node and does not contain any point. The sub-cube C2 is recursively split into 4 sub-cubes (depth 2). The sub-cube C3 is also recursively split and the sub-cube C4 is not split but a point, located in the center of the cube for example, is associated with it, . . . ,etc.

On the right part of FIG. 5 is shown an illustration of the candidate octree-based structure. A black circle indicates that a node is split. A binary flag is associated with each white circle (leaf node) to indicate if the square (a cube in the 3D case) includes (1) or not (0) a point.

According to this example, a point is located in the center of a cube because it avoids any additional information about the spatial location of that point once the cube is identified in the octree-based structure. But the present principles are not limited to this example and may extend to any other spatial location of a point in a cube.

The present principles are not limited to the candidate octree-based structure illustrated on FIG. 5 but extend to any other octree-based structure comprising at least one leaf node whose associated leaf cube includes at least one point.

According to an embodiment of the step 310, when the second octree information data SOID comprises a binary flag per node which equal to 1 to indicate that a cube associated with said node is split and to 0 otherwise (embodiment of step 140) and the second leaf node information data SLID comprises a binary flag per leaf node which equal to 1 to indicate if a leaf cube of a local octree-based structure $O_k$ includes a point representative of a part of the point cloud IPC and to 0 otherwise (embodiment of step 150), the bit-rate $R_{k,n}$ is the sum of the numbers of the binary flags comprised in the second octree information data SOID and the second leaf node information data SLID.

According to another variant, a first sequence of the binary flags comprised in the second octree information data SOID and a second sequence of binary flags comprised in the second leaf node information data SLID are formed and entropy-coded and the bit-rate $R_{k,n}$ is then obtained from the entropy-encoded versions of said first and second sequences.

According to an embodiment of the step 310, the predictor $Pred_{k,n}$ is used for computing the bite rate $R_{k,n}$.

Figure 6:
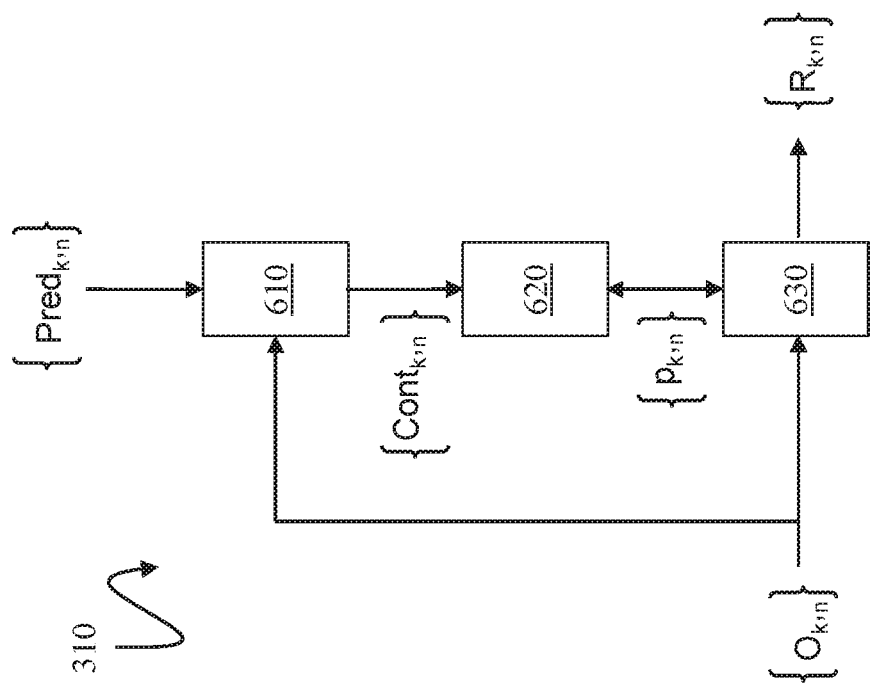
FIG. 6 shows the diagram of the sub-steps of the step 310 of FIG. 3 in accordance with an embodiment of the present principles.

FIG. 6 shows the diagram of the sub-steps of the step 310 in accordance with an embodiment of the present principles.

In step 610, the module M3 determines a set of contexts $Cont_{k,n}$ comprising at least one context C for entropy encoding depending on the predictor $Pred_{k,n}$ and the local octree-based structure $O_{k,n}$. The context C may also depend on different parameters, such as the type of information to be encoded (for example SOID or SLID), and/or the depth of the information to be encoded in the local octree-based structure $O_{k,n}$.

For a candidate octree-based structure $O_{k,n}$ as illustrated by the right part of FIG. 5, the depth value can vary from 0 (for the root of the structure) to 4 (for the nodes associated to the smallest leaf cubes of structure). The type of information is either SOID (second octree information data) or SLID (second leaf node information data).

Figure 7:
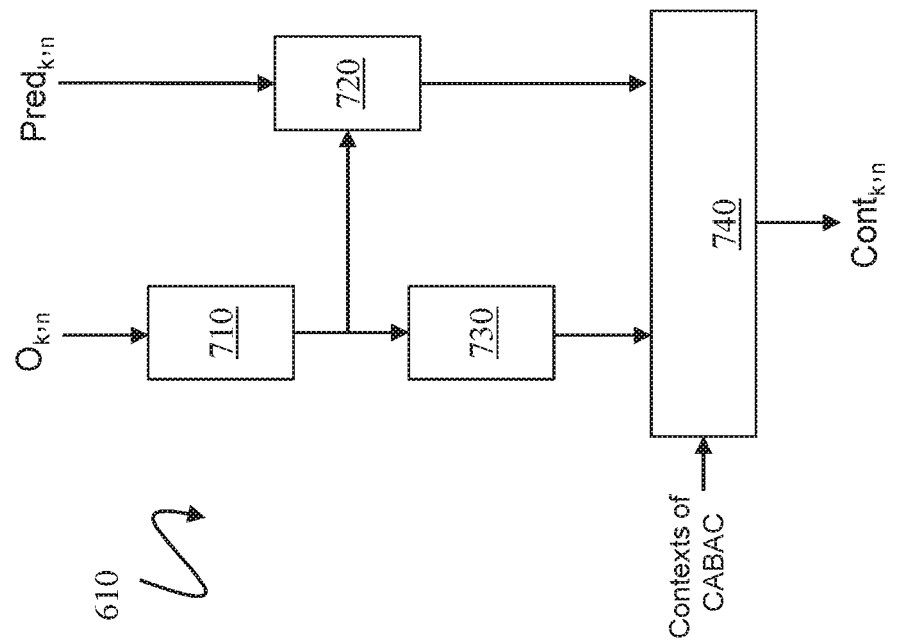
FIG. 7 shows the diagram of the sub-steps of the step 610 of FIG. 6 in accordance with an embodiment of the present principles.

FIG. 7 shows the diagram of the sub-steps of the step 610 in accordance with an embodiment of the present principles.

In step 710, a node of local octree-based structure $O_{k,n}$ is selected.

In step 720, the corresponding node in the predictor $Pred_{k,n}$ is selected and information related to this node of the predictor $Pred_{k,n}$ is generated. For example, this predictor information may comprise a flag "present" if the cube associated with this node of the predictor $Pred_{k,n}$ is split and "non-present" otherwise. This predictor information may also comprise a flag "present" if a leaf cube associated with this node of the predictor $Pred_{k,n}$ includes a point "non-present" otherwise. Other examples of prediction information will be described later.

In step 730, the depth (0 to 4 in the FIG. 5) of the selected node is determined and the type of information (SOID or SLID) related to the selected node is determined.

In step 740, a set of contexts $Cont_{k,n}$ is selected among the contexts of the CABAC based on the information issued from the steps 720 and 730.

In step 620, the module M3 generates a set of probabilities $p_{k,n}$ comprising at least one probability p for the set of contexts $Cont_{k,n}$, one probability p being associated with each context C as well known in the field of the context dependent entropy encoding.

In step 630, the octree information data and the leaf node information data of the candidate octree-based structure $O_{k,n}$ are encoded by a context dependent entropy encoder in order to obtain the rate $R_{k,n}$ associated to the candidate octree-based structure $O_{k,n}$. The bit-rate $R_{k,n}$ is the sum of the numbers of the binary flags comprised in the second octree information data SOID and the second leaf node information data SLID.

The bit rate $R_{k,n}$ is used in combination with the distortion $D_{k,n}$ computed at step 330 in order to compute the cost $C_{k,n}$ at step 340. For each candidate octree-based structure $O_{k,n}$, the distortion $D_{k,n}$ takes into account the spatial distances between, on one hand, the points $P_{k,OR}$, and on the other hand, the points $P_{k,n}$ of candidate octree-based structure $O_{k,n}$.

According to a variant of steps 320 and 330, in step 320, the module M3 also obtains points $P_{k,IP}$ of an inverse-projected point cloud IPPC which are included in the $LOU_k$. Said inverse-projected point cloud IPPC is obtained by inverse-projecting at least one depth images representative of a part of the point cloud IPC, as proposed, for example, in "Image-Based Surface Compression", Tilo Ochotta & Dietmar Saupe, September 2008, in Computer Graphics Forum.

In step 330, the module M3 obtains a distortion $D_{k,n}$ that takes into account spatial distances between, on one hand, said points $P_{k,or}$ of the point cloud, and on the other hand, points $P_{k,n}$ included in leaf cubes associated with leaf nodes of the candidate octree-based structure $O_{k,n}$ together with the points $P_{k,IP}$.

Mathematically speaking, the distortion $D_{k,n}$ is a metric given by:

$$D_{k,n}=d(P_{k,n} \cup P_{k,IP}, P_{k,OR})+d(P_{k,OR}, P_{k,n} \cup P_{k,IP})$$

The distance $d(P_{k,OR}, P_{k,n} \cup P_{k,IP})$ ensures that each point of the point cloud IPC is approximated by points not too far from them, i.e. ensures that parts of the point cloud IPC which are not represented by the inverse-projected point cloud IPPC are well approximated.

In a preferred embodiment, the octree information data and the leaf node information data of the candidate octree-based structure $O_{k,n}$ are encoded by a Context Adaptive Binary Adaptive Coder (CABAC). Such a coder is well known for the man skilled in the art. In summary, such a coder codes a bit b according to a probability p (for example obtained from the set $p_{k,n}$ of probabilities) that b is equal to 1. This probability is provided to an arithmetic coder that then encodes the bit b with the following Shannon performance b=1 is coded using $-\log_2(p)$ bits
b=0 is coded using $-\log_2(1-p)$ bits The probability p is updated after each coding of a symbol b. This provides self-adaptation of the entropy coder to statistics of the signal.

According to an embodiment, the predictors $Pred_{k,n}$ are based on already coded local octree-based structure $O'_k$ obtained by intra prediction or inter prediction. A predictor is made of a set of points that predict the position of the points to be coded typically in $LOU_k$. By predicting, one understands that the position of the points associated with the predictor are close to or substantially identical to the positions of the points to be coded.

If the predictor is for example obtained by intra prediction, the predictor may be obtained from one or several neighboring already coded LOU(s). For example, a prolongment of coded points of the previous $LOU_{k-1}$ in the current $LOU_k$ may be performed using an estimated local plane. This local plane may be interpolated by a Least Mean Square estimation of a plane from the already coded points of the previous $LOU_{k-1}$.

If the predictor is for example obtained by inter prediction, the predictor may be obtained by simply copying of the co-located $LOU_k$ taken from an already coded point cloud (called previous point cloud frame). It corresponds to the SKIP inter mode in video coding.

In a variant of inter prediction, the predictor may be obtained by the technique of block matching. The matching of 3D-blocks is achieved by aligning the points of the current point cloud frame with the points of another point cloud frame under a combination of a plurality of rigid motions including translation and rotation operations. Consequently, a 3D motion information corresponding to a motion vector in video coding may be obtained for each 3D-block. The 3D block may be a cube or a plurality of cubes of the octree structure. Such a 3D motion information consists for example of a vector pointing to the matched 3D-block in the reference point cloud frame, referred to as the matched reference 3D block, and the matched geometric transformation, which transforms the subset of the reference point cloud frame falling into the matched reference 3D-block, to the closest form of the subset of the target point cloud frame falling into the 3D-block currently being encoded, referred to as the target 3D-block. The geometric transformation may be a set of three rotations to represent the rigid transformation of a 3D structure.

As mentioned above, the predictor $Pred_{k,n}$ of a candidate octree-based structure $O_{k,n}$ may be obtained from an already encoded local octree-based structure in the same point cloud or in a previous point cloud. The predictor $Pred_k$, selected among the predictors $Pred_{k,n}$ in step 350, is used for encoding entropically the second octree information data (SOID) and the second leaf node information data (SLID) in the modules M5 and M6 (steps 140 and 150 of FIG. 1).

According to the invention, the context of the entropy encoding of the modules M5 and M6 depends on the type of information (SOID or SLID) to be encoded, on the depth of the node associated to the information (SOID or SLID) to be encoded and on a predictor information related to the predictor $Pred_k$ as disclosed in step 710 for the module M3. As mentioned above for the step 710, the predictor information to be taken into account when encoding information (SOID or SLID) related to a given node of a local octree-based structure $O_k$ is information related the corresponding node of the predictor $Pred_k$. The predictor information related to a SOID may comprise a flag "present" if the cube associated with the corresponding node of the predictor $Pred_k$ is split and "non-present" otherwise. The predictor information related to a SLID may also comprise a flag "present" if a leaf cube associated with the corresponding node of the predictor $Pred_k$ includes a point and "non-present" otherwise.

Figure 8:
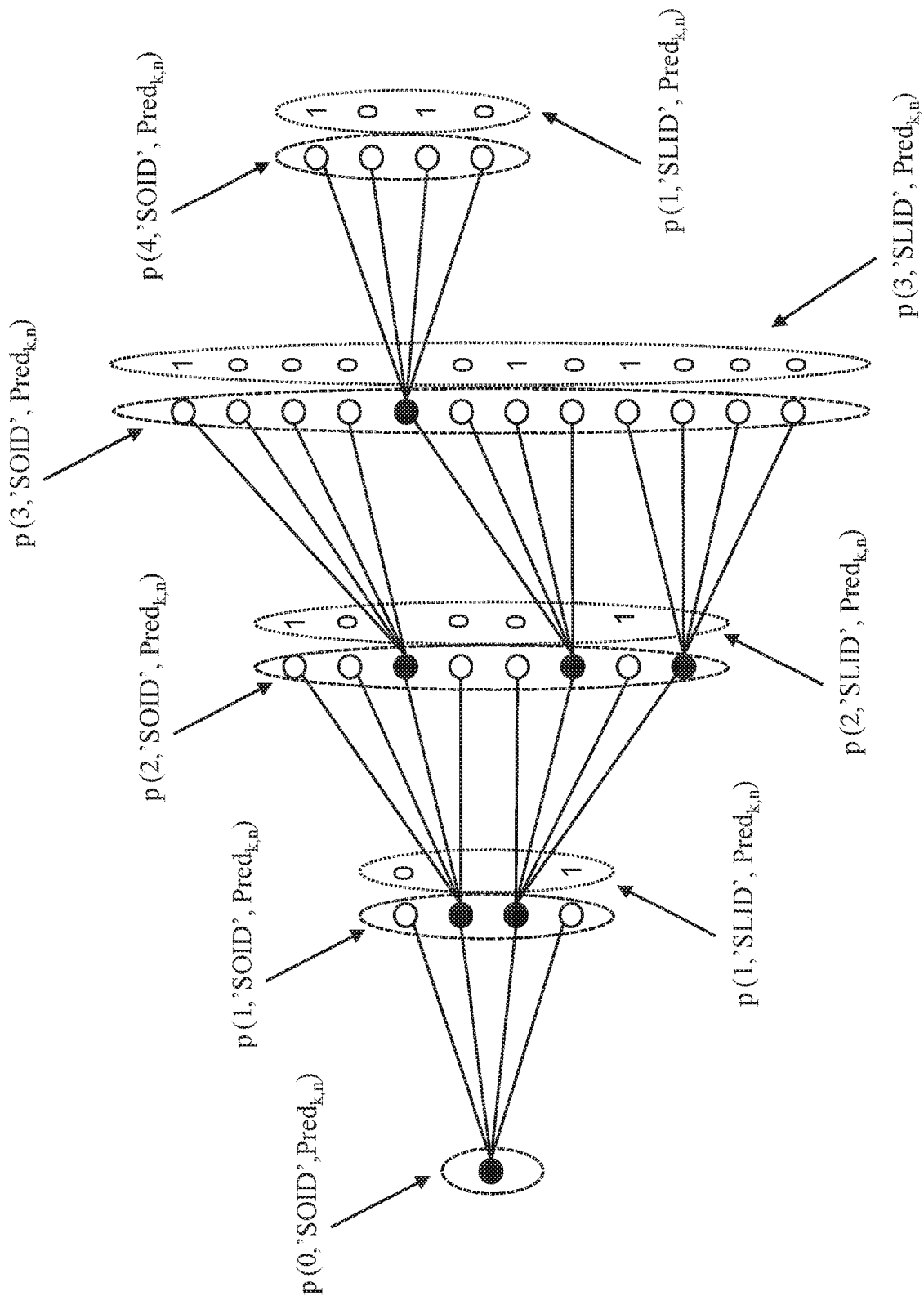
FIGS. 8 and 9 show illustration of an example of probabilities associated to octree information data or leaf node information data of a candidate octree-based structure.

FIG. 8 illustrates the probability p associated to each information of a candidate octree-based structure $O_{k,n}$ of the right part of FIG. 5. For example, the probability p(0, 'SOID',$Pred_{k,n}$) is used for encoding the octree information data of the root node (depth=0) of the candidate octree-based structure $O_{k,n}$. The probability p(2,'SLID',$Pred_{k,n}$) is used for encoding the leaf node information data of the nodes of depth 2 of the candidate octree-based structure $O_{k,n}$. The context used for this encoding depends on the predictor $Pred_{k,n}$.

Figure 9:
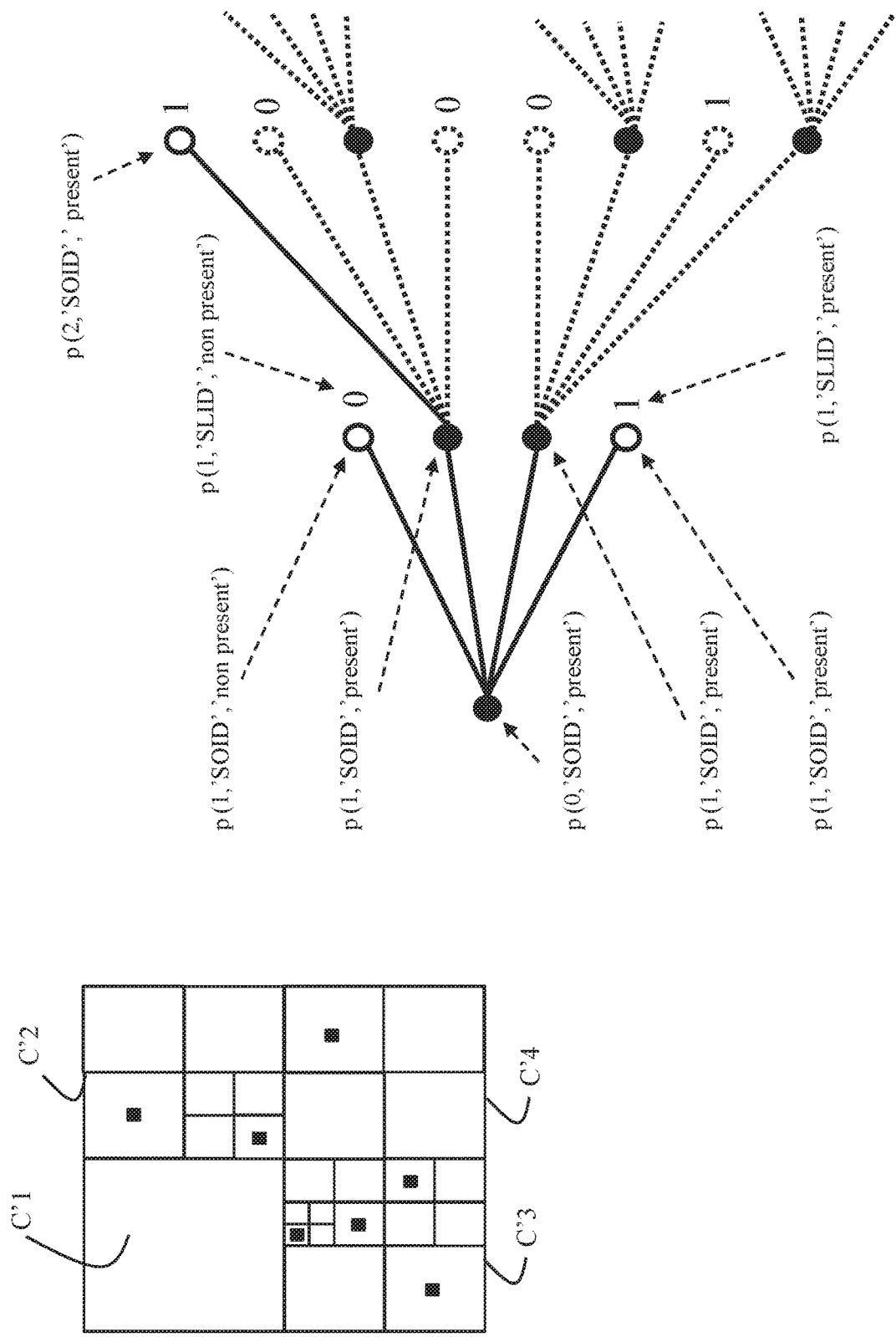

FIG. 9 shows in the left part a predictor $Pred_{k,n}$, i.e. the set of square points belonging to the $LOU_k$, and in the right part the probability associated to some SOID or SLID of the octree-based structure of FIG. 5 to be encoded. The predictor information 'present' is used for selecting the context of entropy encoding of a SOID of a node of $O_{k,n}$ if the cube associated with the corresponding node of the predictor $Pred_{k,n}$ is split. The predictor information 'non present' is used otherwise. Likewise, the predictor information 'present' is used for selecting the context of entropy encoding of a SLID of a node of $O_{k,n}$ if a leaf cube associated with the corresponding node of the predictor $Pred_{k,n}$ includes a point. The predictor information 'non present' is used otherwise.

In reference to the predictor $Pred_{k,n}$ of FIG. 9, as the cube is split into 4 sub-cubes C'1-C'4, the probability p associated to the context (depth='0', information type='SOID', predictor information='present') is used for encoding the corresponding SOID. Likewise, as the sub-cube C'1 does not comprise any point, the probability p associated to the context (depth='1', information type='SLID', predictor information='non present') is used for encoding the corresponding SLID.

Other prediction information may be used. For example, the prediction information for encoding a SLID may be "present" if the predictor has a point in the cube associated to the octree information data SOID to be encoded;

"close" if not "present" but a predictor has a point in a neighboring cube of same depth, neighboring relatively to the cube;

"far" otherwise.

In another example, the prediction information for encoding a SLID may be a quantized distance of the distance between the center of the cube and the closest point in the predictor. A finite number of quantized distances is preferably predefined.

According to an embodiment of the method, a candidate octree-based structure $O_{k,n}$ approximating the geometry of points ($P_{k,or}$) of the point cloud which are included in a leaf cube $LOU_k$ is obtained by pruning an initial candidate octree-based structure $O_n$ at a given level Ie.

Figure 10:
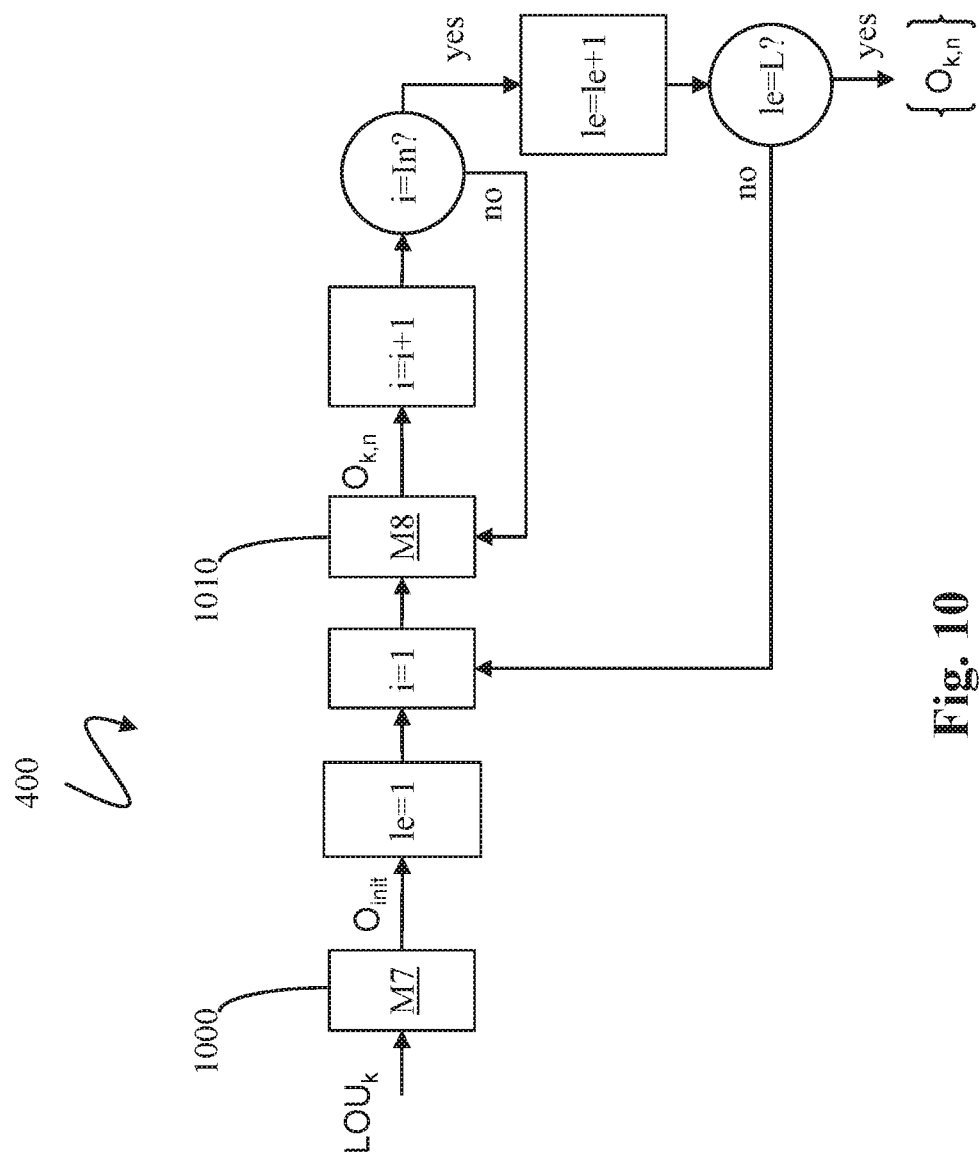
FIG. 10 shows schematically a diagram of the method for pruning an initial candidate octree-based structure at a given level in accordance with an example of the present principles.

FIG. 10 shows schematically a diagram of the method for pruning an initial candidate octree-based structure $O_n$ at a given level Ie in accordance with an example of the present principles. The pruning process is performed during the step 400 of FIG. 4.

In step 1000, a module M7 obtains at least one octree-based structure $O_{init}$ from the points included in the $LOU_k$.

An octree-based structure $O_{init}$ is an octree in which each parent node may comprise at most eight children nodes and in which a cube is associated with each of this node. A root node (depth 0) is the unique node without any parent node and each child node (depth greater than 0) has a single parent node.

The octree-based structure $O_{init}$ may be obtained by splitting recursively the $LOU_k$. An octree-based structure comprises thus a set of at least one cube associated with nodes(s).

A stopping condition for recursive splitting may be checked when a maximum depth is reached or when the size of cube, associated with a node, is smaller than a threshold or when the number of points of the points included in the $LOU_k$ does not exceed a minimum number.

Changing at least one of those stopping condition may lead to multiple initial candidate octree-based structures $O_n$. N is the number of initial candidate octree-based structures $O_n$.

In step 1010, a module M8 obtains at least one octree-based structure $O_{k,n}$ by pruning an initial candidate octree-based structure $O_{init}$ at a given level Ie initialized to 1.

Pruning an initial candidate octree-based structure $O_{init}$ at a level Ie means determining the $I_n$ (depending of n) nodes i at the level Ie which have children, selecting iteratively each node i and, for each node i, obtaining an octree-based structure $O_{k,n}$ from the initial candidate octree-based structure $O_{init}$ by erasing all children (and their potential descendants) of the node i from the octree-based structure $O_{k,n}$.

Figure 11B:
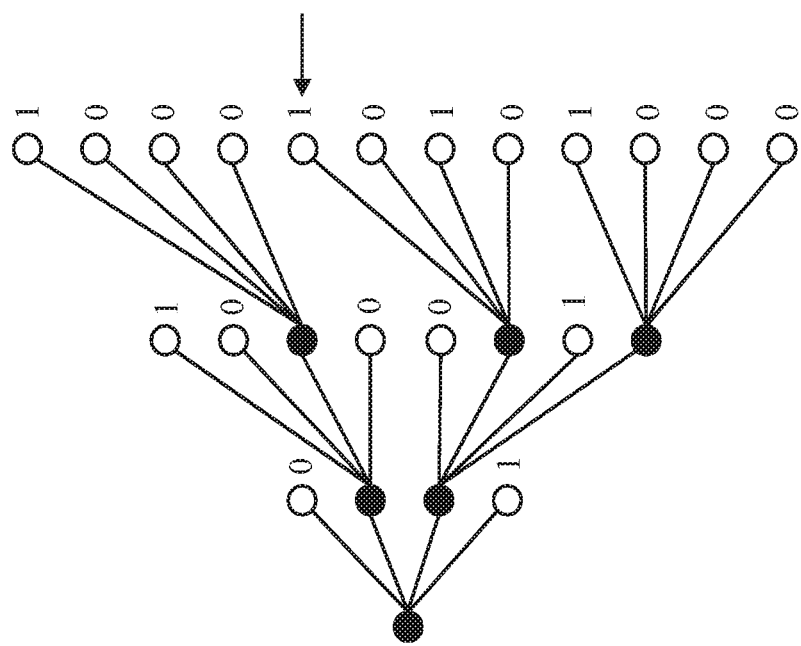
FIG. 11a-b illustrate examples of pruning an octree-based structure at level 3.
Figure 11A:
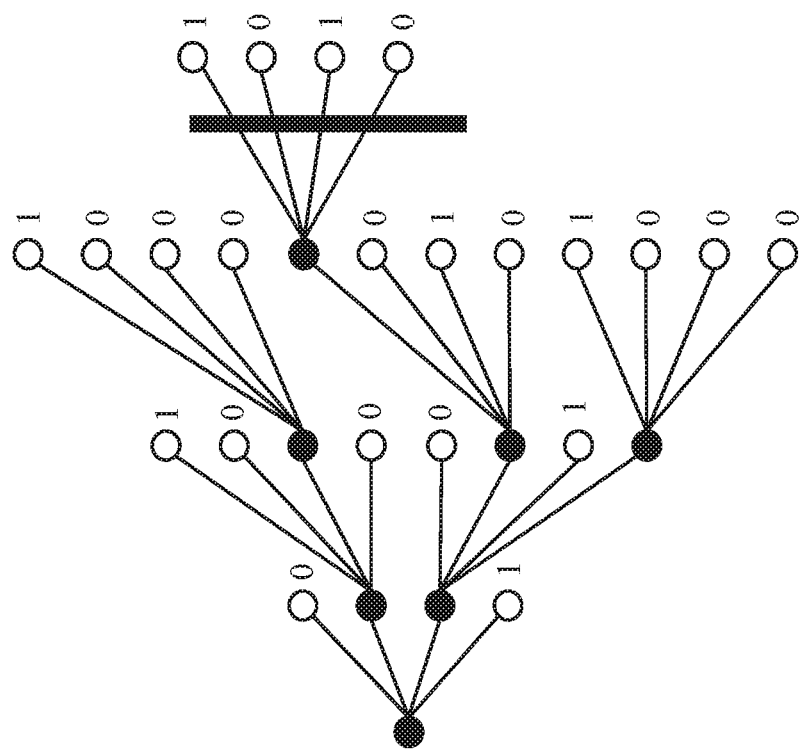
Figure 12B:
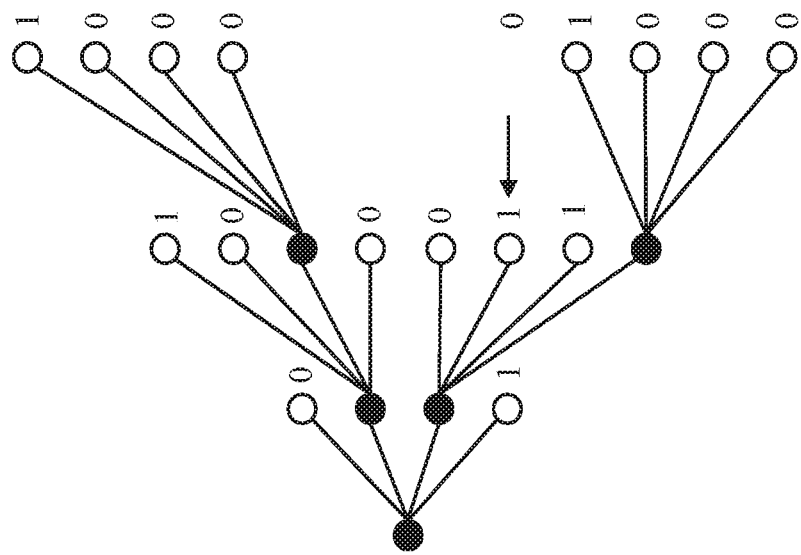
FIG. 12a-b illustrate examples of pruning an octree-based structure at level 2.
Figure 12A:
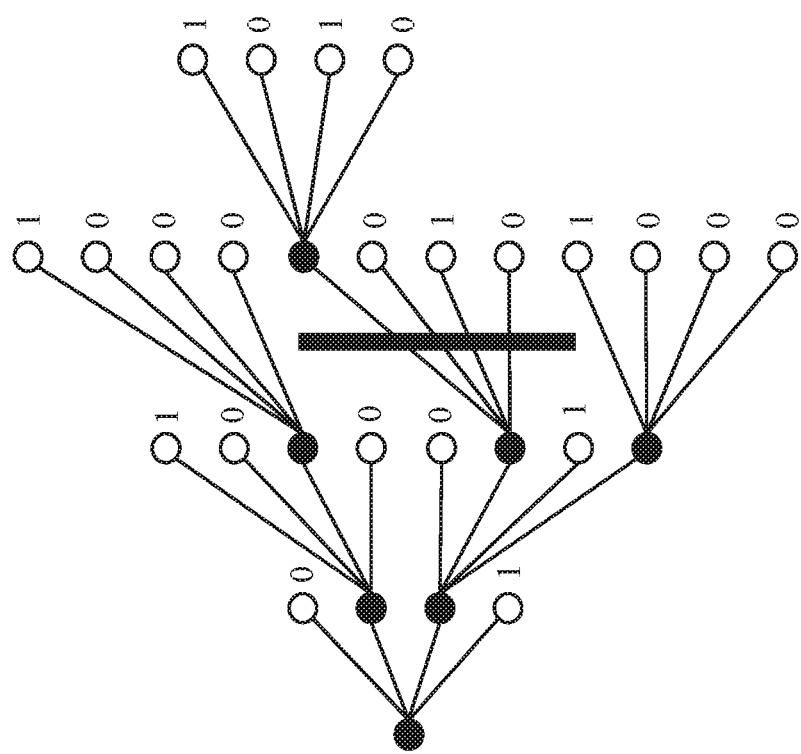
Figure 13B:
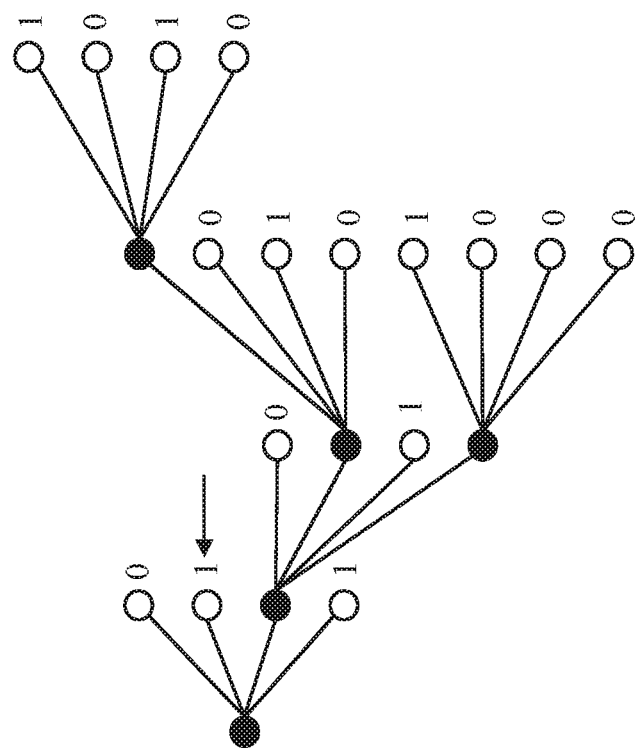
FIG. 13a-b illustrate examples of pruning an octree-based structure at level 1.
Figure 13A:
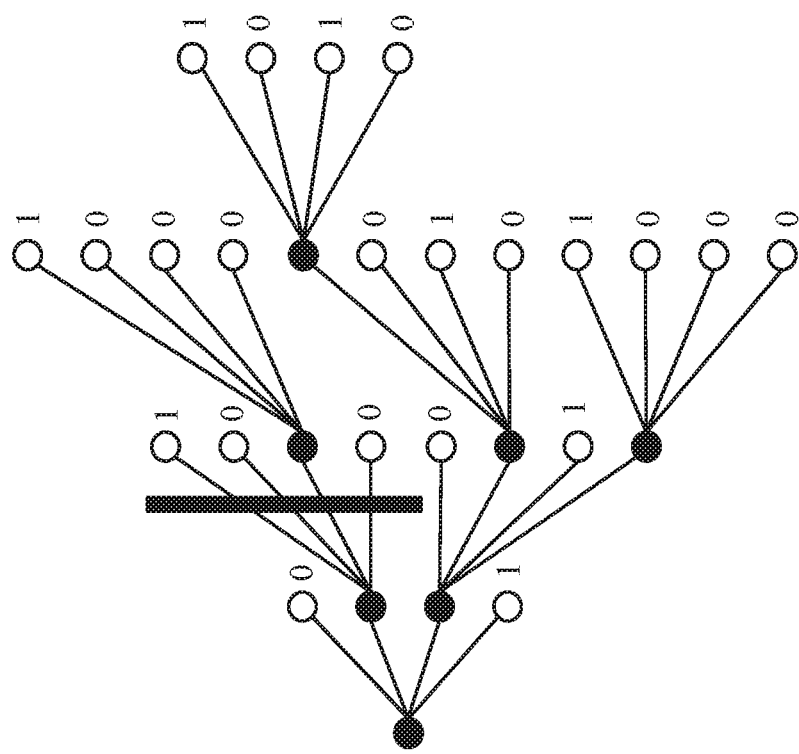

FIG. 11a-b, respectively FIG. 12a-b and FIG. 13a-b, illustrate examples of pruning an octree-based structure at level 3, respectively 2 and 1, in accordance with an example of the present principles.

A black circle indicates that a node is split (has children). A binary flag is associated with each white circle (leaf node) to indicate if a cube associated with this leaf node includes (1) or not (0) at least one 3D point included in the $LOU_k$.

On the left of these Figs. is shown an example of an octree-based structure before the pruning and on the right the octree-based structure after pruning. The pruning level is illustrated by a vertical line and a binary flag (=1) is assigned to the pruned node (designated by a horizontal arrow).

The process is repeated iteratively on all nodes I and levels Ie by replacing the octree-based structure $O_{init}$ by the octree-based structure $O_{k,n}$ in step 1110. A set of candidate octree-based structure $O_{k,n}$ is thus obtained.

Figure 14:
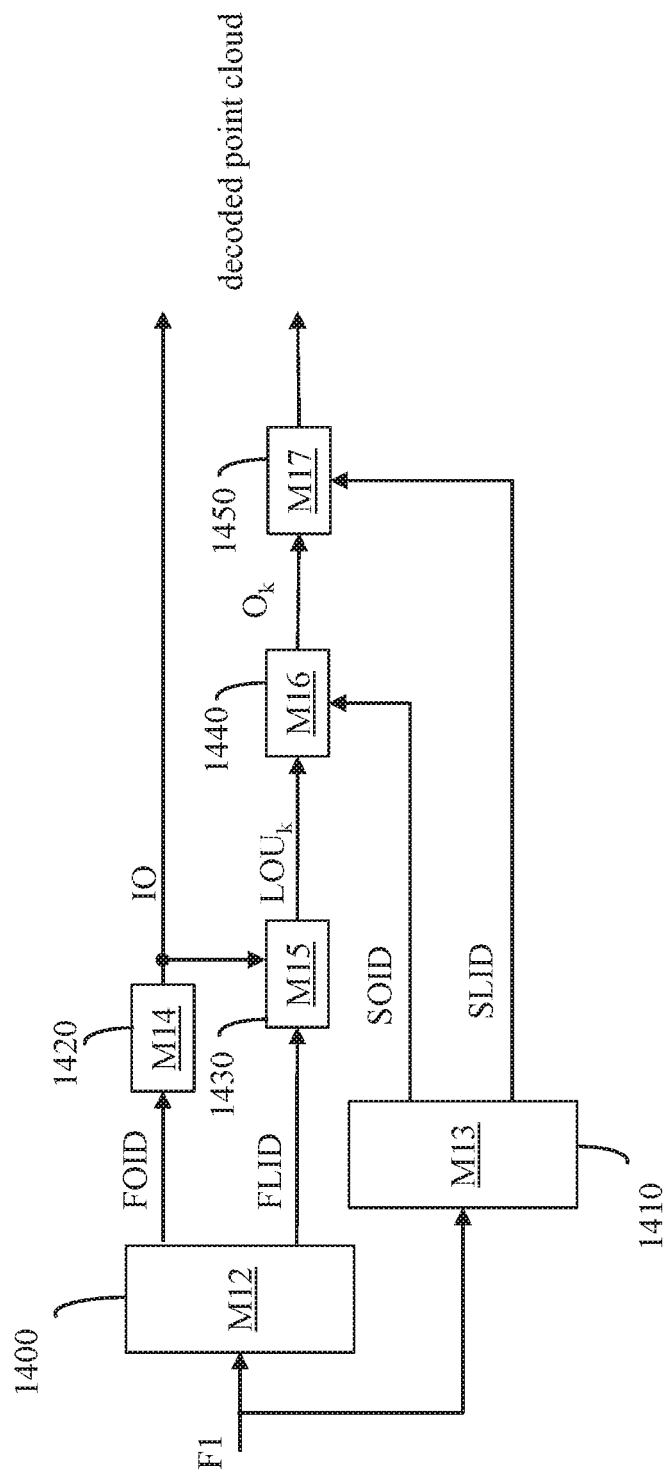
FIG. 14 shows schematically a diagram of the steps of the method for decoding, from a bitstream, the geometry of a point cloud representing a 3D object in accordance with an example of the present principles.

FIG. 14 shows schematically a diagram of the steps of the method for decoding, from a bitstream, the geometry of a point cloud representing a 3D object in accordance with an example of the present principles.

In step 1400, a module M12 decodes, from the bitstream F1, the first octree information data FOID.

In step 1420, a module M14 obtains an octree-based structure IO from the first octree information data FOID.

In step 1410, a module M13 decodes, from the bitstream F1 and the predictor $Pred_k$, the first octree information data FOID, and in step 1430, a module M15 determines if a $LOU_k$ associated with a leaf node of the octree-based structure IO is associated with a local octree-based structure $O_k$ from said first leaf node information data FLID.

If a first leaf node information data FLID indicates that a local octree-based structure $O_k$ has been associated with a $LOU_k$, in step 1410, the module M13 decodes, from the bitstream F1, the predictor $Pred_k$, a second octree information data SOID and a second leaf node information data SLID, and in step 1440 a module M16 obtains a local octree-based structure $O_k$ for said $LOU_k$ from the second octree information data SOID, and in step 1450, a module M17 determines if a leaf cube of said local octree-based structure $O_k$ includes a point representative of a part of the point cloud IPC from the second leaf node information data SLID. In that case, a point is added to the leaf cube of said local octree-based structure $O_k$, preferably in its center.

The octree-based structure IO in which the $LOU_k$ are replaced by the local octree-based structure $O_k$ represent the geometry of the point cloud.

According to an embodiment, the first octree information data FOID, the first leaf node information data FLID, the second octree information data SOID and/or the second leaf node information data SLID may be obtained by entropy-decoding the bitstream F1. The entropy-decoding may be compliant with a CABAC-like coding.

On FIG. 1-14, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 15:
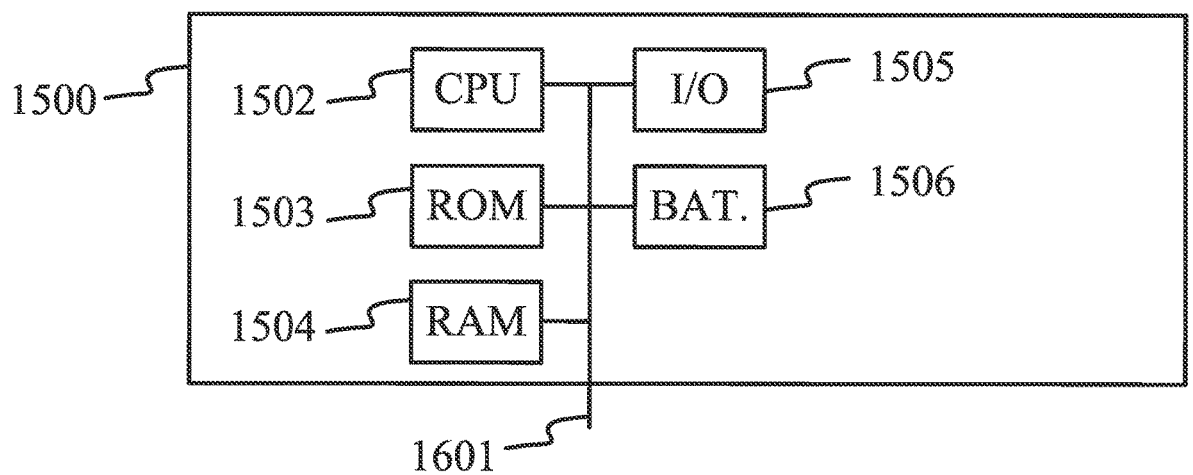
FIG. 15 shows an example of an architecture of a device in accordance with an example of present principles.

FIG. 15 represents an exemplary architecture of a device 1500 which may be configured to implement a method described in relation with FIG. 1-15.

Device 1500 comprises following elements that are linked together by a data and address bus 1501:

- a microprocessor 1502 (or CPU), which is, for example, a DSP (or Digital Signal Processor);
- a ROM (or Read Only Memory) 1503;
- a RAM (or Random Access Memory) 1504;
- an I/O interface 1505 for reception of data to transmit, from an application; and
- a battery 1506.

In accordance with an example, the battery 1506 is external to the device. In each of mentioned memory, the word «register» used in the specification can correspond to area of small capacity (some bits) or to very large area (e.g. a whole program or large amount of received or decoded data). The ROM 1503 comprises at least a program and parameters. The ROM 1503 may store algorithms and instructions to perform techniques in accordance with present principles. When switched on, the CPU 1502 uploads the program in the RAM and executes the corresponding instructions.

RAM 1504 comprises, in a register, the program executed by the CPU 1502 and uploaded after switch on of the device 1500, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the point cloud IPC is obtained from a source. For example, the source belongs to a set comprising:

- a local memory (1503 or 1504), e.g. a video memory or a RAM (or Random Access Memory), a flash memory, a ROM (or Read Only Memory), a hard disk;
- a storage interface (1505), e.g. an interface with a mass storage, a RAM, a flash memory, a ROM, an optical disc or a magnetic support;
- a communication interface (1505), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded point cloud is sent to a destination; specifically, the destination belongs to a set comprising:

- a local memory (1503 or 1504), e.g. a video memory or a RAM, a flash memory, a hard disk;
- a storage interface (1505), e.g. an interface with a mass storage, a RAM, a flash memory, a ROM, an optical disc or a magnetic support;
- a communication interface (1505), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface);
- a rendering device; and
- a display.

In accordance with examples of encoding or encoder, the bitstream F1 is sent to a destination. As an example, the bitstream F1 is stored in a local or remote memory, e.g. a video memory (1504) or a RAM (1504), a hard disk (1503).

In a variant, the bitstream F1 is sent to a storage interface (1505), e.g. an interface with a mass storage, a flash memory, ROM, an optical disc or a magnetic support and/or transmitted over a communication interface (1505), e.g. an interface to a point to point link, a communication bus, a point to multipoint link or a broadcast network.

In accordance with examples of decoding or decoder, the bitstream F1 is obtained from a source. Exemplarily, a bitstream is read from a local memory, e.g. a video memory (1504), a RAM (1504), a ROM (1503), a flash memory (1503) or a hard disk (1503). In a variant, the bitstream is received from a storage interface (1505), e.g. an interface with a mass storage, a RAM, a ROM, a flash memory, an optical disc or a magnetic support and/or received from a communication interface (1505), e.g. an interface to a point to point link, a bus, a point to multipoint link or a broadcast network.

In accordance with examples, device 1500 being configured to implement an encoding method described in relation with FIG. 1-13, belongs to a set comprising:
- a mobile device;
- a smartphone or a TV set with 3D capture capability
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

In accordance with examples, device 1500 being configured to implement a decoding method described in relation with FIG. 14, belongs to a set comprising:
- a mobile device;
- a Head Mounted Display (HMD)
- (mixed reality) smartglasses
- an holographic device
- a communication device;
- a game device;
- a set top box;
- a TV set;
- a tablet (or tablet computer);
- a laptop;
- a display
- a stereoscopic display and
- a decoding chip.

Figure 16:
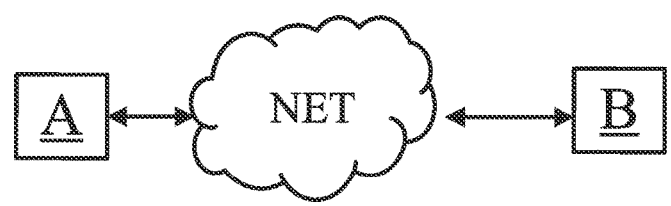
FIG. 16 shows two remote devices communicating over a communication network in accordance with an example of present principles.

According to an example of the present principles, illustrated in FIG. 16, in a transmission context between two remote devices A and B over a communication network NET, the device A comprises a processor in relation with memory RAM and ROM which are configured to implement a method for encoding a colored point cloud as described in relation with the FIGS. 1-13 and the device B comprises a processor in relation with memory RAM and ROM which are configured to implement a method for decoding as described in relation with FIG. 14.

In accordance with an example, the network is a broadcast network, adapted to broadcast encoded colored point clouds from device A to decoding devices including the device B.

A signal, intended to be transmitted by the device A, carries the bitstream F1.

This signal may thus carry the first octree information data FOID, the first leaf node information data FLID, the second octree information data SOID and/or the second leaf node information data SLID.

Figure 17:
FIG. 17 shows the syntax of a signal in accordance with an example of present principles.

FIG. 17 shows an example of the syntax of such a signal when the data are transmitted over a packet-based transmission protocol. Each transmitted packet P comprises a header H and a payload PAYLOAD.

According to embodiments, the payload PAYLOAD may comprise at least one of the following elements:
- the first octree information data FOID representative of the octree-based structure IO;
- the first leaf node information data FLID indicating if a local octree-based structure $O_k$ has been determined for a $LOU_k$ associated with a leaf node of the octree-based structure IO;
- the second octree information data SOID representative of a local octree-based structure $O_k$;
- the second leaf node information data SLID indicating if a leaf cube of a local octree-based structure $O_k$ includes a point representative of a part of the point cloud IPC, and
- information representative of the predictor $Pred_k$.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, a HMD, smart glasses, and any other device for processing an image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   determining an octree-based structure representing points of a point cloud included in a leaf cube associated with a leaf node;
   obtaining a predictor of said determined octree-based structure from an already coded octree-based structure;
   encoding a first information representative of said determined octree-based structure by using a first context dependent entropy encoding; and
   encoding a second information indicating if a leaf cube associated with a leaf node of said determined octree-based structure includes a point representative of a part of the point cloud by using a second context dependent entropy encoding,
   wherein the context of at least one of said first and second context dependent entropy encodings is depending on said predictor.

2. The method of claim 1, wherein an information representative of said predictor is also encoded.

3. The method of claim 1, wherein the first and second context dependent entropy encoding are a Context Adaptative Binary Arithmetic Coding.

4. The method of claim 1, wherein the already coded octree based structure represents points of the point cloud.

5. The method of claim 1, wherein the already coded octree based structure represents points of a previous point cloud.

6. The method of claim 1, wherein the context of the first context dependent entropy encoding for encoding a second information of the first type associated with a node of the determined octree-based structure is depending on the presence or not of a splitting of the cube associated with the corresponding node of the predictor.

7. The method of claim 1, wherein the context of the second context dependent entropy encoding for encoding a second information of the second type associated with a node of the octree-based structure is depending on the presence or not of a point in the leaf cube associated with the corresponding node of the predictor.

8. The method of claim 1, wherein the context of the second context dependent entropy encoding for encoding the second information of the second type associated with a node of the octree-based structure is depending on the distance between the center of the leaf cube and the closest point in the octree-based structure of the predictor.

9. The method of claim 1, wherein the context of at least one of said first and second context dependent entropy encodings is determined based on an octree depth value associated to the information of the first type of the information of the second type to be encoded.

10. The method according to claim 1, wherein the octree-based structure belongs to a global octree-based structure obtained by splitting recursively a cube comprising the point cloud until leaf cubes, associated with leaf nodes of said global octree-based structure, reach down an expected size; and the method comprises
    encoding an information of a third type representative of the global octree-based structure.

11. A method comprising:
    decoding a first information of a second type indicating that an octree-based structure has been determined for approximating points of a point cloud included in a leaf cube associated with a leaf node;
    decoding an information representative of a predictor of said octree-based structure;
    obtaining an octree-based structure for said leaf cube by context adaptive entropy decoding a second information of the second type using a first context;
    determining if a leaf cube of said octree-based structure includes a point of the point cloud to be decoded by context adaptive entropy decoding an information of a first type using a second context, and in that case, adding a point to the leaf cube of said octree-based structure, wherein at least one of the first and second context is depending on said predictor.

12. The method of claim 11, wherein the method also comprises:
    decoding, an information a third type;
    obtaining a global octree-based structure comprising the octree based structure from said information of the third type.

13. A non-transitory processor-readable medium having stored thereon instructions to execute the method according to claim 1 when this program is executed on a computer.

14. A non-transitory processor-readable medium having stored thereon instructions to execute the method according to claim 11 when this program is executed on a computer.

15. A device comprising electronic circuitry adapted for:
    determining an octree-based structure representing points of a point cloud included in a leaf cube associated with a leaf node;
    obtaining a predictor of said determined octree based structure from an already coded octree based structure;
    encoding a first information of a first type representative of said determined octree-based structure by using a first context dependent entropy encoding; and
    encoding a first information of a second type indicating if a leaf cube associated with a leaf node of said determined octree-based structure includes a point representative of a part of the point cloud by using a second context dependent entropy encoding,
wherein the context of at least one of said first and second context dependent entropy encodings is depending on said predictor.

16. The device of claim 15, wherein an information representative of said predictor is also encoded.

17. The device of claim 15, wherein the first and second context dependent entropy encoding are a Context Adaptative Binary Arithmetic Coding.

18. The device of claim 15, wherein the already coded octree based structure represents points of the point cloud.

19. The device of claim 15, wherein the already coded octree-based structure represents points of a previous point cloud.

20. The device of claim 15, wherein the context of the first context dependent entropy encoding for encoding a second information of the first type associated with a node of the determined octree-based structure is depending on the presence or not of a splitting of the cube associated with the corresponding node of the predictor.

21. The device of claim 15, wherein the context of the second context dependent entropy encoding for encoding a second information of the second type associated with a node of the octree-based structure is depending on the presence or not of a point in the leaf cube associated with the corresponding node of the predictor.

22. The device of claim 15, wherein the context of the second context dependent entropy encoding for encoding the second information of the second type associated with a node of the octree-based structure is depending on the distance between the center of the leaf cube and the closest point in the octree-based structure of the predictor.

23. The device of claim 15, wherein the context of at least one of said first and second context dependent entropy encodings is determined based on an octree depth value associated to the information of the first type of the information of the second type to be encoded.

24. The device of claim 15, wherein the octree-based structure belongs to a global octree-based structure obtained by splitting recursively a cube comprising the point cloud until leaf cubes, associated with leaf nodes of said global octree-based structure, reach down an expected size; and the electronic circuitry is further adapted for:
encoding an information of a third type representative of the global octree-based structure.

25. A device comprising electronic circuitry adapted for:
decoding an information of a second type indicating that an octree-based structure has been determined for approximating points of a point cloud included in a leaf cube associated with a leaf node;
decoding, an information representative of a predictor of said octree-based structure;
obtaining an octree-based structure for said leaf cube by context adaptive entropy decoding an information of a second type using a first context;
determining if a leaf cube of said local octree-based structure includes a point of the point cloud to be decoded by context adaptive entropy decoding an information of a second type using a second context, and in that case, adding a point to the leaf cube of said octree-based structure, wherein the at least one of the first and the second context is depending on said predictor.

26. The device of claim 25, wherein the electronic circuitry is also adapted for:
decoding an information of a third type;
obtaining a global octree based structure comprising the octree based structure from said information of the third type.

* * * * *